(12) United States Patent
Herre et al.

(10) Patent No.: US 9,315,005 B2
(45) Date of Patent: Apr. 19, 2016

(54) METHOD AND DEVICE FOR PRODUCING MIRROR UNITS FOR HELIOSTATS

(75) Inventors: Erwin Herre, Buchdorf (DE); Bernd Vogt, Meitingen (DE)

(73) Assignee: Grenzebach Maschinenbau GmbH, Asbach-Baeumenheim (DE)

( * ) Notice: Subject to any disclaimer, the term of this patent is extended or adjusted under 35 U.S.C. 154(b) by 185 days.

(21) Appl. No.: 14/232,037

(22) PCT Filed: Jul. 26, 2012

(86) PCT No.: PCT/DE2012/000760
§ 371 (c)(1),
(2), (4) Date: Jan. 10, 2014

(87) PCT Pub. No.: WO2013/013661
PCT Pub. Date: Jan. 31, 2013

(65) Prior Publication Data
US 2014/0144570 A1    May 29, 2014

(30) Foreign Application Priority Data
Jul. 28, 2011   (DE) .......................... 10 2011 108 715

(51) Int. Cl.
| | | |
|---|---|---|
| *F24J 2/46* | (2006.01) | |
| *B32B 37/14* | (2006.01) | |
| *G02B 7/183* | (2006.01) | |
| *F24J 2/10* | (2006.01) | |
| *F24J 2/52* | (2006.01) | |

(52) U.S. Cl.
CPC ............... *B32B 37/14* (2013.01); *F24J 2/1057* (2013.01); *F24J 2/46* (2013.01); *G02B 7/183* (2013.01); *F24J 2/5254* (2013.01); *F24J 2002/1014* (2013.01); *F24J 2002/4676* (2013.01); *Y02E 10/40* (2013.01)

(58) Field of Classification Search
CPC ........................................................ F24J 2/46
USPC ..................... 156/299, 378, 64; 359/850, 853
See application file for complete search history.

(56) References Cited

U.S. PATENT DOCUMENTS

| | | | |
|---|---|---|---|
| 4,229,077 A | | 10/1980 | Schwab |
| 4,456,332 A | * | 6/1984 | Anderson ..................... 156/305 |
| 4,511,618 A | | 4/1985 | Duchene et al. |
| 4,792,482 A | | 12/1988 | Leach |

(Continued)

FOREIGN PATENT DOCUMENTS

| | | |
|---|---|---|
| DE | 3134690 | 4/1982 |
| DE | 202007008593 | 8/2007 |
| FR | 2505022 | 11/1982 |
| GB | 2042761 | 9/1980 |

(Continued)

*Primary Examiner* — Jeff Aftergut
*Assistant Examiner* — Jaeyun Lee
(74) *Attorney, Agent, or Firm* — Duane Morris LLP; J. Rodman Steele, Jr.; Gregory M. Lefkowitz

(57) ABSTRACT

A method and a device for producing mirror units for heliostats, comprising a main body as a carrier of a reflective surface and a fixing carriage to ensure stress-free mounting of the main body during production, comprising the following features: a) a feed for main bodies (13) by means of a mirror-carrier delivery feed (3), b) a feed for fixing carriages (2) by means of running rails (4), c) a device for transferring a main body (13) into a fixing carriage, d) a mirror feed (8), e) an adhesive bonding device (5), f) a device for pressing a main body (13) together with a plurality of mirrors (11) and g) a measuring device (9) for checking relevant tolerances of the production process.

9 Claims, 7 Drawing Sheets

(56) References Cited

U.S. PATENT DOCUMENTS

| | | |
|---|---|---|
| 5,483,386 A | 1/1996 | Carson |
| 6,068,715 A | 5/2000 | Yokokita et al. |
| 8,430,090 B2 | 4/2013 | Angel et al. |
| 2011/0233517 A1 | 9/2011 | Hwang |

FOREIGN PATENT DOCUMENTS

| | | |
|---|---|---|
| GB | 2104444 | 3/1983 |
| JP | S58194090 A | 11/1983 |
| JP | S63192002 A | 8/1998 |
| JP | 2013015612 A | 1/2013 |

* cited by examiner

Fig. 5  A-A

METHOD AND DEVICE FOR PRODUCING MIRROR UNITS FOR HELIOSTATS

CROSS-REFERENCE TO RELATED APPLICATIONS

This application is a §371 national stage entry of International Application No. PCT/DE2012/000760, filed Jul. 26, 2012, which claims priority to German Patent Application No. 10 2011 108 715.3 filed Jul. 28, 2011, the entire contents of which are incorporated herein by reference.

The present invention relates to the production of mirror units of heliostats.

A heliostat is a mechanical device having a reflective surface, which always reflects the sunlight onto the same fixed point, irrespective of the change in the position of the sun in the daytime sky.

The probably earliest mention of heliostats will be found in a book by the Dutch physicist Willem J. Gravesande from the year 1742.

DE 20 2007 008 593 U1 discloses a heliostat for solar tower power plants having an upright and a carrier device arranged thereon, which accommodates a reflector, so that the attitude of the reflector in relation to the altitude of the sun can be varied about an axis of rotation and a pivot axis.

In this device, the object that is to be achieved is to devise a heliostat in which the production costs are low, the permanent operating costs are low and exact driving of the reflector is possible.

This object is achieved, according to the features in the characterizing clause of claim 1, in that the adjustment of the position of the reflector is provided by using a hydraulic drive unit, and in that the electric drive unit comprises at least one hydraulic lifting cylinder for initiating a rotational movement and at least one hydraulic lifting cylinder for initiating a pivoting movement.

Furthermore, provision is made for the hydraulic drive unit to have a pump assembly and at least one hydraulic reservoir for driving the hydraulic lifting cylinders connected thereto and for a positive pressure to be applied to the hydraulic reservoir.

It is further seen as an advantage in this solution that, in the event of a power failure, the reflectors can be moved rapidly out of the focus by means of the preloaded hydraulic system in order to prevent overheating or destruction of the absorber. However, because of the multiplicity of flanged plates fitted to the respective reflector and the associated fastening points on the carrier frame, exact adjustment of the reflectors with regard to the curvature in the direction of the absorber of the solar tower power plant is not possible, since the expenditure on time for this purpose would be immense. As a result, there follows a reduction in the efficiency, although this has hitherto been accepted on account of the enormous expenditure on time for adjustment. In an array of heliostats of such a heliostat installation, curving of the reflector is performed on some groups of reflectors. As a result of the fixed clamping of the reflector in relation to the carrier frame and the stress produced in the reflector following the adjustment of the curvature, it is possible for destruction of the reflector to occur as a result of external influences, such as stone impacts or squalls. The different thermal expansions of the reflector housing and the carrier frame also increase the risk of breakage further in this case.

DE 31 33 906 A1 discloses a radiation reflector supporting structure and a method for the production thereof which, amongst other things, is also conceived for use in solar collectors. Sun or solar collectors of the type concerned in this case can be constructed in the form of rotational paraboloids, which are frequently also designated shallow shells, which focus reflected sunlight onto a single focal point, which moves with the shallow shell. Furthermore, mention is made here of the fact that two-axis heliostats focus reflected sunlight onto a fixed focus at the tip of a tower and, alternatively, such reflective surfaces can be trough-like with a parabolic cross section, sunlight being focused onto a linear focus.

In DE 31 33 906 A1, devising an improved rear-side supporting structure for reflective surfaces of sun reflectors, amongst others, is intended; it should be possible for the supporting structure to be produced from economical structural materials which nevertheless fulfill their purpose to a sufficient extent.

In order to achieve this object, according to patent claim 14, a trough-like solar reflector is proposed which has a reflector in the form of a parabolic trough with a longitudinal axis of symmetry for the reflection of sunlight and for focusing the reflected sunlight onto a linear focus, and having a rear-side supporting structure, this supporting structure having the following features:

1) a thin layer of glass fiber reinforced concrete applied in an adhering manner to the rear surface of the reflector,
2) a torque support cast monolithically onto this layer, which extends parallel to the longitudinal axis of the reflector and lies in a plane bisecting the reflector, and
3) a plurality of transverse ribs, which extend from the torque support outward to both edges of the reflector, wherein the torque support and the transverse ribs are tubular and each have a form coated with a thin layer of glass fiber reinforced concrete.

These examples listed from the prior art are not suitable for mass production of precisely fabricated mirror units.

It is therefore an object of the present invention to devise a device and a method for producing mirror units for heliostats which ensure precise and stress-free fabrication.

This object is achieved by the device as claimed in claim 1:

A device for producing mirror units for heliostats comprising a main body as carrier of a reflective surface and a fixing carriage to ensure stress-free mounting of the main body during production, comprising the following features:
a) a feed for main bodies (13) by means of a mirror carrier delivery feed (3),
b) a feed for fixing carriages (2) by means of running rails (4),
c) a device for transferring a main body (13) into a fixing carriage,
d) a mirror feed (8),
e) an adhesive bonding device (5),
f) a device for pressing on a main body (13) with a plurality of mirrors (11),
g) a measuring device (9) for checking relevant tolerances of the production process.

Claim 2:
The device as claimed in claim 1,
characterized in that
each fixing carriage (2) has, on its two opposite transverse sides, holding plates (18, 28) which each ensure the mounting of a main body (13) by means of a two-point mounting, wherein both holding plates (18, 28) can be actuated pneumatically and, in addition, on one side, a holding plate (18) permits slight rotation of the main body (13) via a rotating and fixing device (17, 21), and wherein stress-free fixing is carried out by means of a locking brake.

Claim 3:
  The device as claimed in claim 1 or 2,
  characterized in that
  the output signal from the rotational angle sensor is used for quality control.

Claim 4:
  The device as claimed in one of the preceding claims,
  characterized in that
  the main body (13) is provided with lateral fixing points (14).

Claim 5:
  The device as claimed in one of the preceding claims,
  characterized in that
  by means of the adhesive bonding device (5), a plurality of parallel beads of adhesive (10) of different thickness are applied simultaneously.

Claim 6:
  The device as claimed in one of the preceding claims,
  characterized in that
  the device for pressing on a main body (13) with a plurality of mirrors (11) has a pressure plate (29) which is flexurally rigid in all directions and, on its active surface, has an adjustable curvature which corresponds to the desired curvature of the mirror surfaces.

Claim 7:
  The device as claimed in one of the preceding claims,
  characterized in that
  the measuring device (9) has means for checking all the relevant parameters which can have fabrication tolerances.

and, respectively, the method as claimed in claim 8:
  A method for producing mirror units for heliostats having a main body as a carrier of a reflective surface and a fixing carriage to ensure stress-free mounting of the main body during production, comprising the following features:
  a) main bodies (13) are fed to a production line by means of a mirror carrier delivery feed (3), wherein said main bodies are either fabricated on site from metal sheets by means of connecting means or are supplied in fabricated form,
  b) fixing carriages (2) are fed to the production line by means of running rails (4), wherein said fixing carriages have, on each transverse side, means for a two-point mounting of a main body (13) and, by means of play-free mounting of the main body (13) on one of the two sides by means of a rotating and fixing apparatus (17, 21), stress-free mounting is ensured, wherein any possible rotation of the main body (13) resulting therefrom is registered by means of a sensor,
  c) in each case a main body (13) is transferred into a fixing carriage (2) by means of a gripping apparatus and fixed without stress by pneumatic means,
  d) by means of an adhesive bonding device (5), a plurality of parallel beads of adhesive (10) of different thickness are applied simultaneously,
  e) via a mirror feed (8), by means of a gripping apparatus, in each case a mirror (10) is removed from a store and is placed on the surface of the main body (13) provided with adhesive, wherein this operation is completed when the entire envisaged surface is covered with mirrors (10),
  f) the main body (13) covered with mirrors (10) in this way is fed to a device for pressing on the mirrors (10) with the main body (13) by means of a pressure plate (29),
  g) following the completion of the adhesive bonding operation, the fixing carriage (2) is fed to a measuring device (9), in which all the relevant parameters of the production process are checked for impermissible tolerances.

Claim 9:
  The method as claimed in claim 8,
  characterized in that
  the device for pressing on the mirrors (11) with the main body (13) has a pressure plate (29) which is flexurally rigid in all directions and, on its active surface, has an adjustable curvature which corresponds to the desired curvature of the mirror surfaces.

Claim 10:
  A computer program comprising a program code for carrying out the method steps as claimed in either of claims 8 and 9 when the program is executed in a computer.

Claim 11:
  A machine-readable carrier comprising the program code of a computer program for carrying out the method as claimed in either of claims 8 and 9 when the program is executed in a computer.

In essence, this solution consists in that the stress-free mounting and placing of the mirrors used on the main body at a high cycle rate of the fabrication of mirror units is achieved by means of constructional measures.

The device according to the invention will be described in more detail below.

In the figures, in detail:

Figure 1:
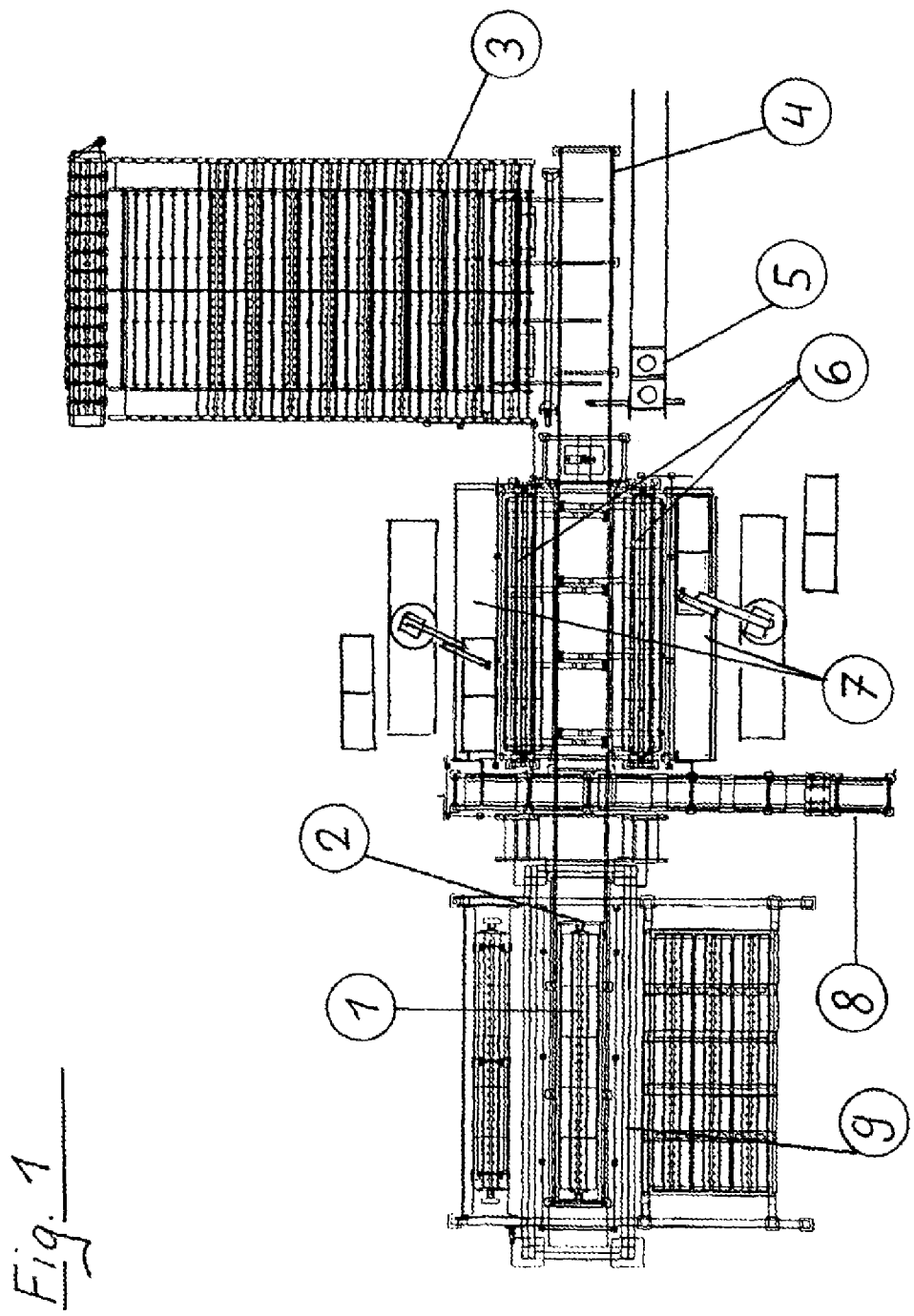
FIG. 1 shows a plan view of the production installation

FIG. 1 shows a plan view of the production installation according to the invention for heliostat mirror units 1, comprising five mirrors 11 which are located beside one another but which are not designated here, for clarity. This heliostat mirror unit 1 is mounted in a fixing carriage 2. Illustrated in the left-hand area of FIG. 1 here is a measuring device 9, in which the quality testing of the heliostat mirror units 1 supplied by the production line is carried out. The function thereof will be explained later. Here, all the tolerance areas of the relevant fabrication dimensions are monitored and, if necessary, faulty specimens are separated out.

The position of the heliostat mirror unit 1 shown here identifies the central production line, in the area of which the necessary workpieces are supplied from both sides and accesses are made to the workpieces in the production process.

In the right-hand area of the installation shown in FIG. 1, a mirror carrier delivery feed 3 feeding the central production line is shown. A mirror carrier comprises an elongated molding tapering to a point on the two long sides, the length of which molding corresponds approximately to the length of five mirrors laid on one another. Its cross section is designated by the designation main body 13 in FIG. 2. It will be described in more detail there. A mirror carrier is respectively placed in a fixing carriage 2 and fixed there without stress in a way according to the invention, as will be described later. The necessary fixing carriages 2 are supplied on the running rails 4. Appropriate devices are familiar to those skilled in the art.

On the other side of the production line, opposite to the mirror carrier delivery feed 3, an adhesive bonding device 5 is shown. This device 5 supplies the surface of the respective mirror carriers, the mirror carrier surface 12, with beads of adhesive 10 in the longitudinal direction, as is to be shown better later in FIG. 2. In the sketch-like illustration of FIG. 1, only a tube-like feed point for adhesive is shown. It goes without saying that, for the purpose of faster application of adhesive, in each case each bead of adhesive is allocated such a feed point.

In the central region of the installation shown in FIG. 1, on both sides of this production line, apparatuses 7 for laying on mirrors are illustrated. Here, these apparatuses 7 comprise, by way of example, gripper robots which remove the necessary mirrors respectively from a supply store, illustrated by way of a sketch, wherein the general feeding of mirrors 11 is carried out by means of the mirror feed 8. Fixing and pressing the mirrors onto the mirror carrier surface 12 provided with beads of adhesive 10 is carried out by means of an apparatus 6.

Figure 2:
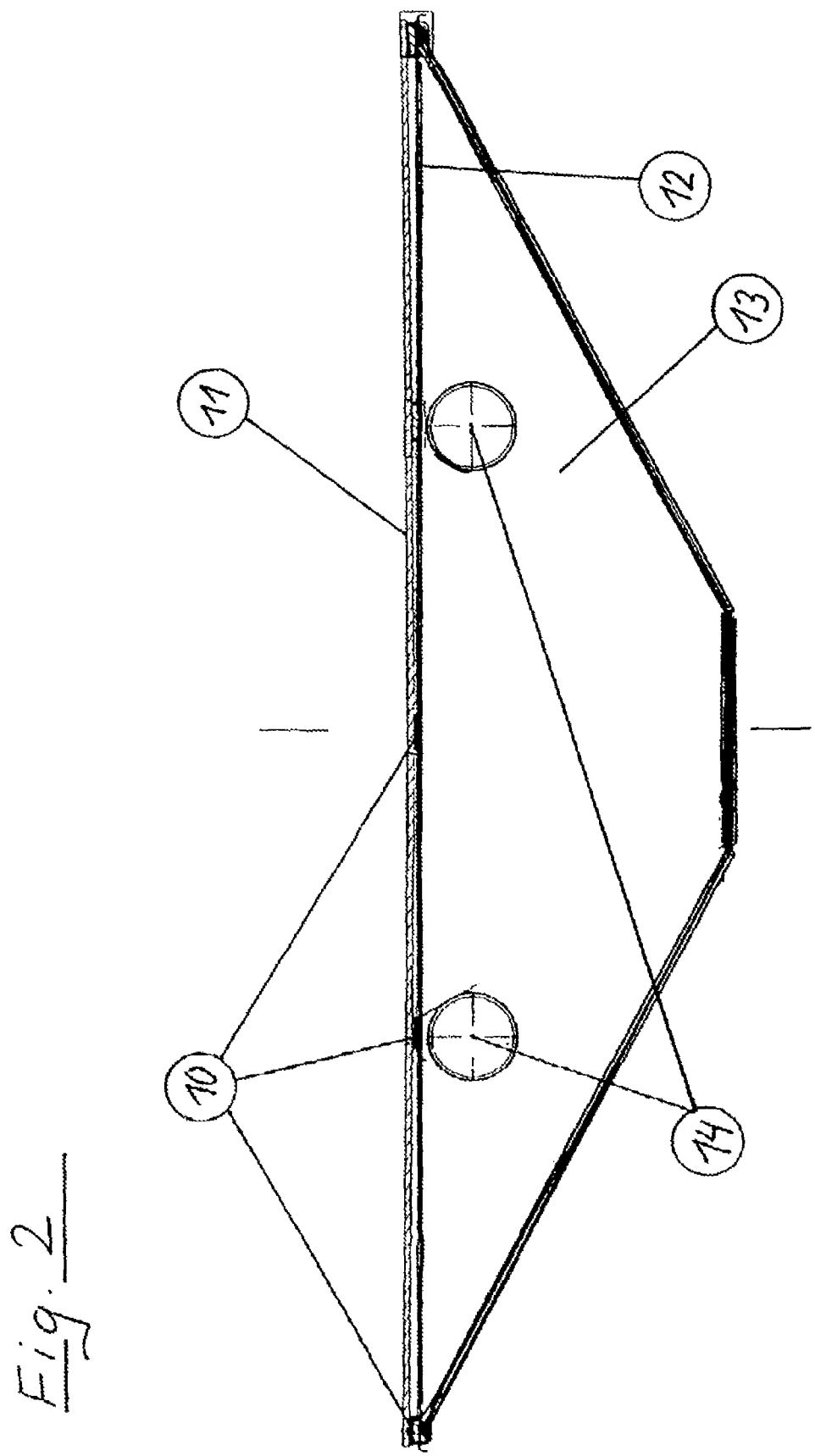
FIG. 2 shows a cross section of the main body of the mirror unit

FIG. 2 shows a cross section of the main body of the mirror unit. The main body 13 of a heliostat mirror unit comprises two end plates, shown in cross section in FIG. 2, in the form of a molding tapering to a point on the two long sides. The mirror carrier surface 12 has beads of adhesive 10 applied thereto. In FIG. 2, three beads of adhesive 10 are designated by way of example only on the left-hand side from the left edge as far as the center. The right-hand side correspondingly has further beads of adhesive applied thereto. The function of the fixing points designated by 14 will be explained during the description of FIGS. 3, 4 and 5.

Figure 3:
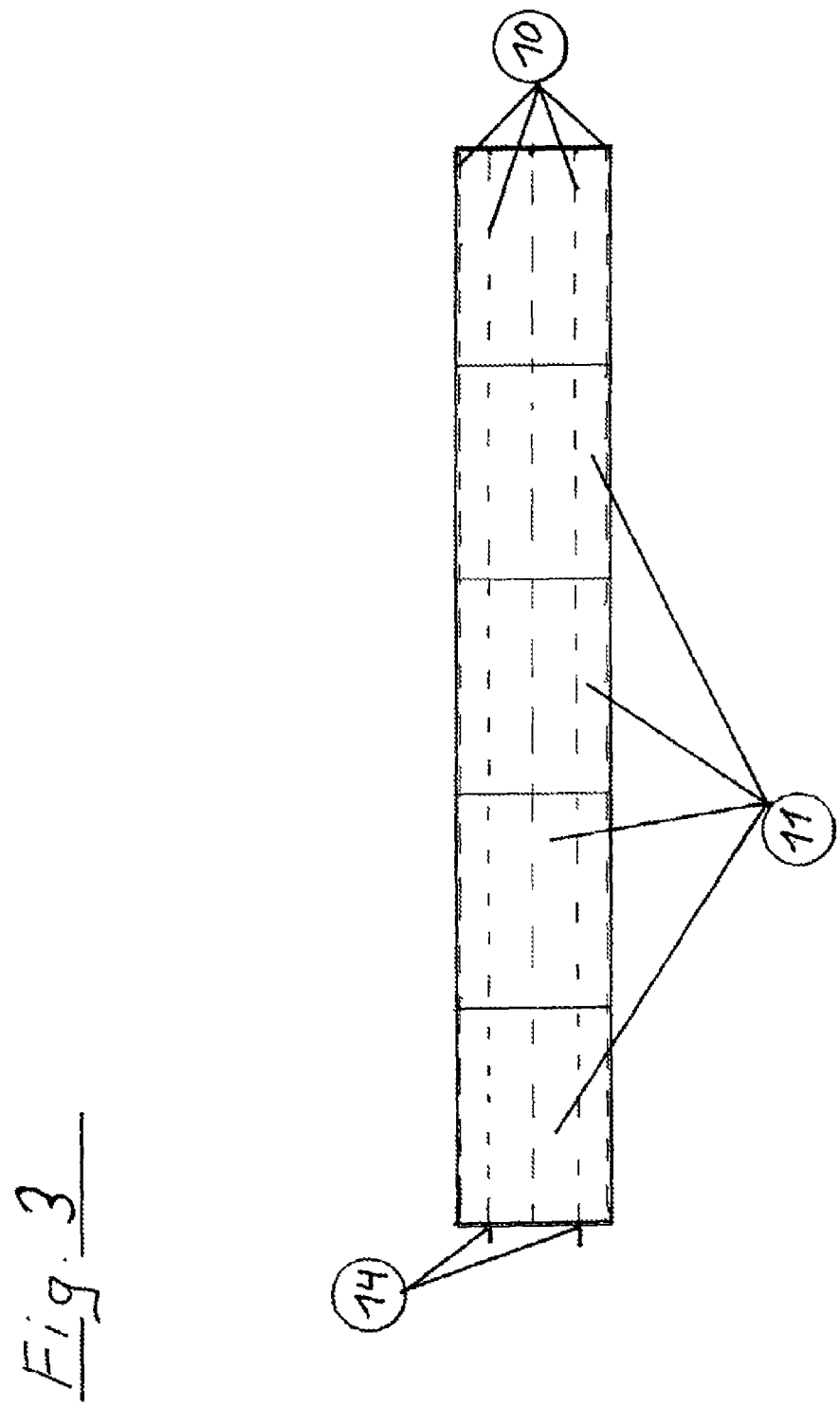
FIG. 3 shows a plan view of a mirror unit

FIG. 3 shows a plan view of a mirror unit. Shown here are the five mirrors 11 lying beside one another, representing a heliostat mirror unit by way of example, to which a plurality of beads of adhesive 10 have been applied. Marked on the left-hand side are the fixing points 14, which are also located at the corresponding point on the right-hand side.

Figure 4:
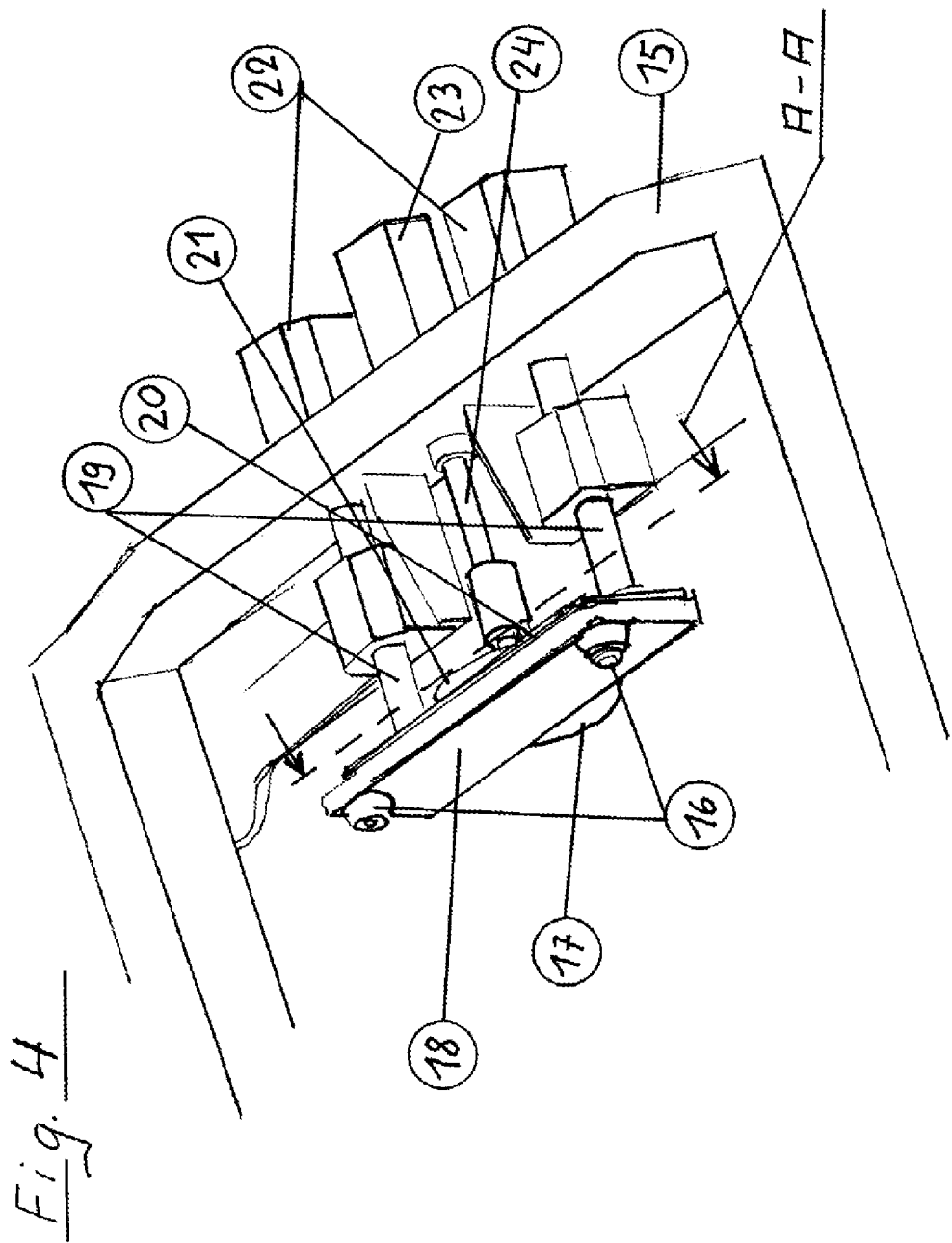
FIG. 4 shows an oblique view of the holding area of a fixing carriage

An oblique view of the holding area of a fixing carriage is illustrated in FIG. 4. Here, two bushes 22 for the horizontal guidance 19 of a holding and fixing apparatus are let into the frame 15 of a fixing carriage; a pressure cylinder 23 having a piston rod 24 is provided in the center of the two bushes 22 for the horizontal movement of the holding and fixing apparatus. The rotating apparatus for holding the main body 13 without stress comprises a front rotating disk 17 which is connected to a holding plate 18, which in turn carries two centering cones 16 and a rear rotating disk holder with locking brake 21, which is connected to a connecting plate 20.

Figure 5:
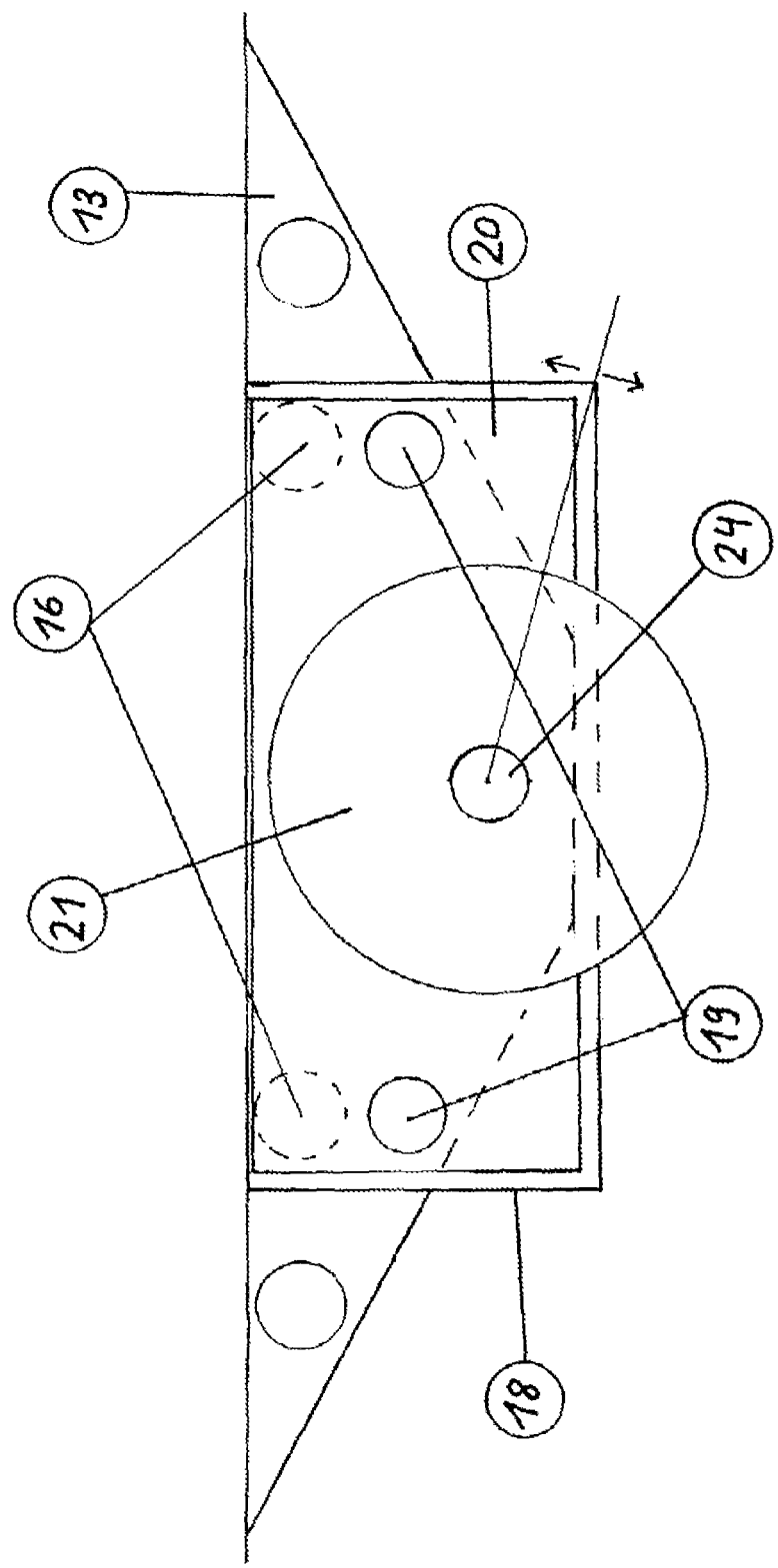
FIG. 5 shows a section A-A of the fixing and rotating area

FIG. 5 shows a section A-A from the fixing and holding area of the arrangement shown in FIG. 4 from the rear from the direction of the piston rod 24. The connecting plate 22 is designed to be smaller here than the holding plate 18 of the front rotating disk. The designations correspond to those described in FIG. 4. The arrows shown in the right-hand corner of FIG. 5 are intended to indicate a possible permissible rotation of the main body (13). The rotation is fixed by means of rotating disk holder and locking brake 21. Such a rotation is detected by means of a rotational angle sensor, not illustrated.

Figure 6:
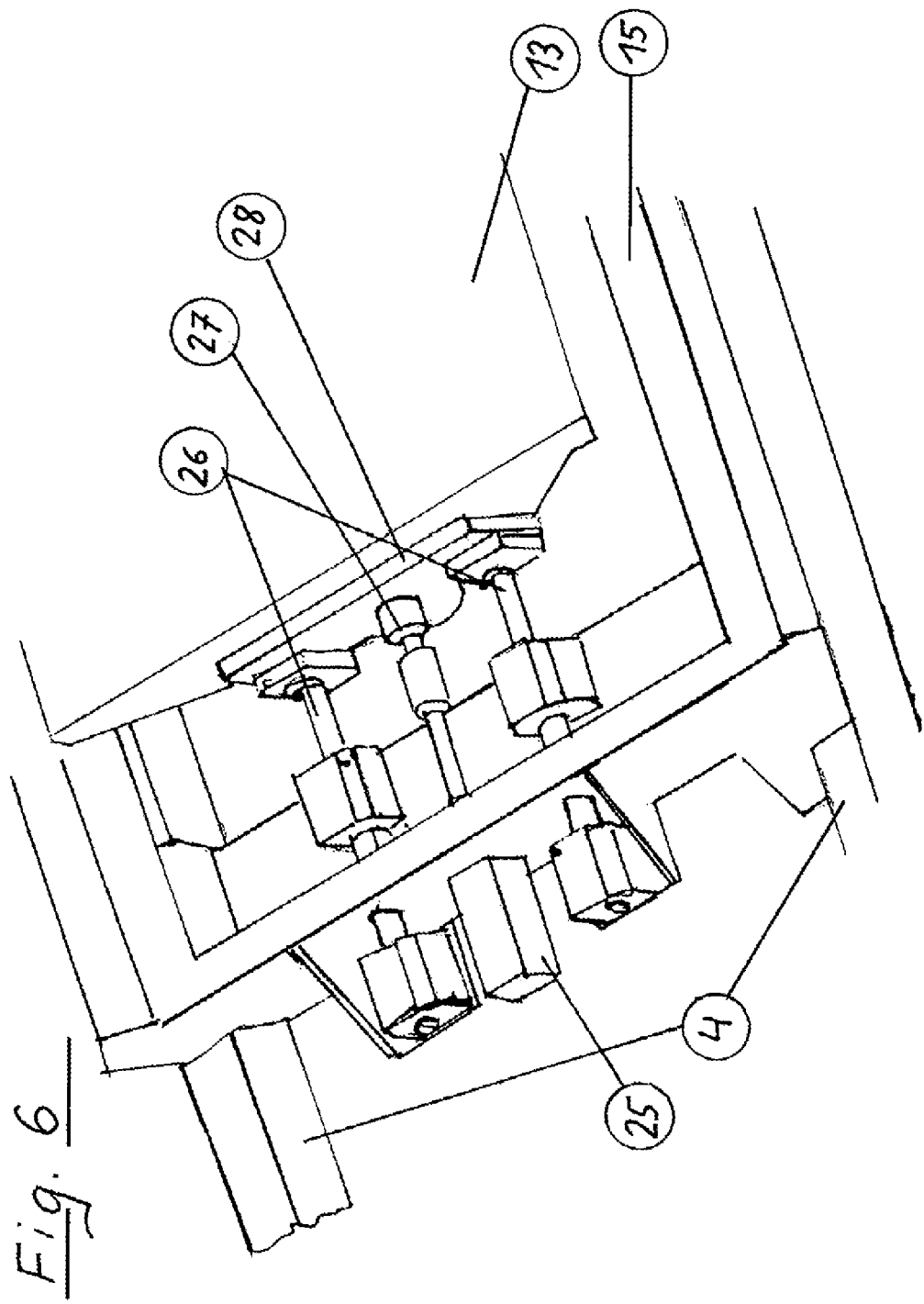
FIG. 6 shows an oblique view of the fixing area of a fixing carriage

FIG. 6 shows an oblique view of the fixing area of a fixing carriage 2 on the two running rails 4, as illustrated in FIG. 1.

The area of the fixing carriage shown here corresponds to the other end of the frame 15 shown in FIG. 4, the main body 13 being clamped in between the two end regions of the frame 15 that are shown. Also provided on this side are two horizontal guides 26, corresponding to the horizontal guides 19 of FIG. 4, a holding plate 28, corresponding to the holding plate 18 in FIG. 4, and a piston rod 27, corresponding to the piston rod 24 in FIG. 4. Here, the pressure cylinder 25 corresponds to the pressure cylinder 23 in FIG. 4. The centering cones on the holding plate 28, corresponding to the centering cones 16, cannot be seen here.

The functioning of the fixing according to the invention of the mirror carrier or a main body 13 consists in the mirror carrier being fixed absolutely without stress. Any possibly present slight distortion of the main body 13 is compensated for by means of a rotation of the front rotating disk 17 in relation to the position of the rear rotating disk holder 21 and fixed by means of locking brake. Here, expediently the main body 13 is firstly inserted into the holding apparatus shown in FIG. 6 and then clamped in by means of the holder and rotating apparatus, as shown in FIG. 4, and fixed without stress by the locking brake 21 without any torsional forces in relation to the longitudinal axis of the main body 13.

Figure 7:
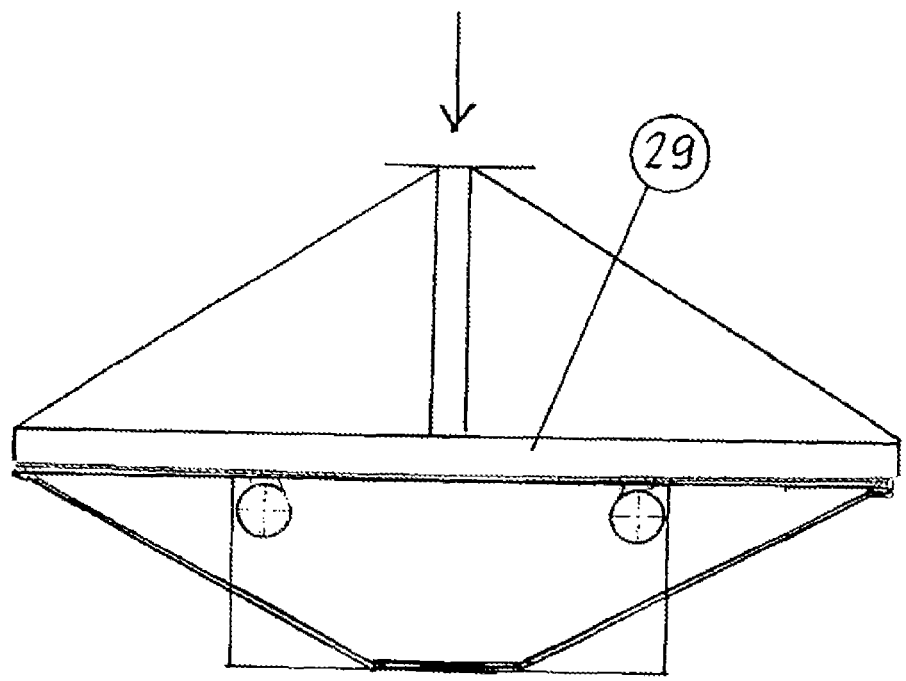
FIG. 7 shows a cross section from the pressing area of the mirror unit.

FIG. 7 shows a cross section from the pressure area of the mirror unit by means of a device for pressing on the mirrors (11). Here it is possible to see in cross section how, by means of a pressure plate (29) for mirror fixing, the mirror 11 is pressed onto the mirror carrier surface 12 until the beads of adhesive have hardened. This device implementing the contact pressure receives for its control a signal from a rotational angle sensor which is installed in the area of the two holding plates 18, 20 and which registers a relative rotation of these two holding plates 18, 20 and therefore of the main body 13. By means of the set curvature of the absolutely flexurally rigid pressure plate 29 and the beads of adhesive 10 distributed differently in terms of thickness, the desired curvature of the respective mirror 11 is thus permanently obtained. Further stresses compensated for by means of the rotating and fixing apparatus are compensated for by an appropriate distribution of the adhesive compound. Since the position of a fixing carriage and of the pressure plate 29 in relation to each other are set fixedly, the position of the mirror 11 is fixed permanently and exactly by means of the adhesive in accordance with the desired stipulations, even if a main body 13 is slightly distorted. In this way, it is ensured that each main body is connected to the corresponding mirrors without stress.

The final quality testing of the mirror unit is likewise carried out without stress in order to avoid measuring errors, with the fixing carriage in the measuring device 9. By means of further sensors, not only the dimensions and the load-bearing ability of the mirror unit produced but also the relevant parameters of the mirrors 11 are registered and a measurement log is created for each mirror unit.

The control of the complex movement operations and the signal processing of the sensors used require a specific control program of the installation.

LIST OF DESIGNATIONS

1 Heliostat mirror unit
2 Fixing carriage
3 Mirror carrier delivery feed
4 Running rails for the fixing carriages
5 Adhesive bonding device
6 Apparatus for fixing and pressing on the mirrors
7 Apparatus for laying on mirrors
8 Mirror feed
9 Measuring device
10 Beads of adhesive
11 Mirror
12 Mirror carrier surface
13 Main body of a heliostat mirror unit 14 Fixing points of a heliostat mirror unit
15 Frame of a fixing carriage
16 Centering cone (fixing anchor)
17 Front fixing rotating disk
18 Holding plate of the front fixing rotating disk
19 Horizontal guide of the holding and fixing apparatus
20 Connecting plate (for horizontal guide and rear rotating disk holder)
21 Rear rotating disk holder with locking brake
22 Bushes of the horizontal guide
23 Pressure cylinder of the rotating and fixing apparatus
24 Piston rod
25 Pressure cylinder of the fixing side
26 Horizontal guide of the fixing side
27 Piston rod of the fixing side
28 Connecting and holding plate of the fixing side
29 Pressure plate of the mirror fixing

The invention claimed is:

1. A device for producing mirror units for heliostats comprising a main body as carrier of a reflective surface and a fixing carriage to ensure stress-free mounting of the main body during production, comprising the following features:
    a) a feed for main bodies (13) by means of a mirror carrier delivery feed (3),
    b) a feed for fixing carriages (2) by means of running rails (4),
    c) a device for transferring a main body (13) into a fixing carriage,
    d) a mirror feed (8),
    e) an adhesive bonding device (5),
    f) a device for pressing on a main body (13) with a plurality of mirrors (11),
    g) a measuring device (9) for checking relevant tolerances of the production process.

2. The device as claimed in claim 1, wherein each fixing carriage (2) has, on its two opposite transverse sides, holding plates (18, 28) which each ensure the mounting of a main body (13) by means of a two-point mounting, wherein both holding plates (18, 28) can be actuated pneumatically and, in addition, on one side, a holding plate (18) permits slight rotation of the main body (13) via a rotating and fixing device (17, 21), and wherein stress-free fixing is carried out by means of a locking brake.

3. The device as claimed in claim 1 wherein the output signal from the rotational angle sensor is used for quality control.

4. The device as claimed in claim 1, wherein the main body (13) is provided with lateral fixing points (14).

5. The device as claimed in claim 1, wherein by means of the adhesive bonding device (5), a plurality of parallel beads of adhesive (10) of different thickness are applied simultaneously.

6. The device as claimed in claim 1, wherein the device for pressing on a main body (13) with a plurality of mirrors (11) has a pressure plate (29) which is flexurally rigid in all directions and, on its active surface, has an adjustable curvature which corresponds to the desired curvature of the mirror surfaces.

7. The device as claimed in claim 1, wherein the measuring device (9) has means for checking all the relevant parameters which can have fabrication tolerances.

8. A method for producing mirror units for heliostats having a main body as a carrier of a reflective surface and a fixing carriage to ensure stress-free mounting of the main body during production, comprising the following features:
    a) main bodies (13) are fed to a production line by means of a mirror carrier delivery feed (3), wherein said main bodies are either fabricated on site from metal sheets by means of connecting means or are supplied in fabricated form,
    b) fixing carriages (2) are fed to the production line by means of running rails (4), wherein said fixing carriages have, on each transverse side, means for a two-point mounting of a main body (13) and, by means of play-free mounting of the main body (13) on one of the two sides by means of a rotating and fixing apparatus (17, 21), stress-free mounting is ensured, wherein any possible rotation of the main body (13) resulting therefrom is registered by means of a sensor,
    c) in each case a main body (13) is transferred into a fixing carriage (2) by means of a gripping apparatus and fixed without stress by pneumatic means,
    d) by means of an adhesive bonding device (5), a plurality of parallel beads of adhesive (10) of different thickness are applied simultaneously,
    e) via a mirror feed (8), by means of a gripping apparatus, in each case a mirror (10) is removed from a store and is placed on the surface of the main body (13) provided with adhesive, wherein this operation is completed when the entire envisaged surface is covered with mirrors (10),
    f) the main body (13) covered with mirrors (10) in this way is fed to a device for pressing on the mirrors (10) with the main body (13) by means of a pressure plate (29),
    g) following the completion of the adhesive bonding operation, the fixing carriage (2) is fed to a measuring device (9), in which all the relevant parameters of the production process are checked for impermissible tolerances.

9. The method as claimed in claim 8, wherein the device for pressing on the mirrors (11) with the main body (13) has a pressure plate (29) which is flexurally rigid in all directions and, on its active surface, has an adjustable curvature which corresponds to the desired curvature of the mirror surfaces.

* * * * *